(12) United States Patent
Barron

(10) Patent No.: US 7,044,368 B1
(45) Date of Patent: May 16, 2006

(54) MULTI-FUNCTIONAL DATA CARD

(76) Inventor: Gary Barron, 1221 Whitter, Pasadena, TX (US) 77505

( * ) Notice: Subject to any disclaimer, the term of this patent is extended or adjusted under 35 U.S.C. 154(b) by 0 days.

(21) Appl. No.: 10/779,308

(22) Filed: Feb. 17, 2004

(51) Int. Cl.
*G06K 5/00* (2006.01)

(52) U.S. Cl. ............................ 235/380; 235/492

(58) Field of Classification Search .............. 235/492, 235/380, 375, 382, 381, 383, 486, 487; 705/43, 705/44, 45
See application file for complete search history.

(56) References Cited

U.S. PATENT DOCUMENTS

| | | | |
|---|---|---|---|
| 4,338,025 A | | 7/1982 | Engel |
| 4,667,087 A | * | 5/1987 | Quintana .................... 235/380 |
| D305,023 S | | 12/1989 | Suto |
| 5,192,947 A | * | 3/1993 | Neustein .................... 340/7.63 |
| 5,276,311 A | * | 1/1994 | Hennige ..................... 235/380 |
| 5,457,747 A | | 10/1995 | Drexler et al. |
| 5,623,552 A | * | 4/1997 | Lane .......................... 382/124 |
| 5,767,896 A | * | 6/1998 | Nemirofsky ................. 725/23 |
| 5,884,271 A | * | 3/1999 | Pitroda ........................ 705/1 |
| 5,907,142 A | * | 5/1999 | Kelsey ........................ 235/380 |
| 6,012,636 A | * | 1/2000 | Smith ......................... 235/380 |
| 6,079,621 A | | 6/2000 | Vardanyan et al. |
| 6,213,403 B1 | | 4/2001 | Bates, III |
| 6,219,439 B1 | | 4/2001 | Burger |

* cited by examiner

*Primary Examiner*—Thien M. Le

(57) ABSTRACT

A multifunctional data card for carrying personal information includes a housing that has a keypad for initializing a selected program and entering a user access code unique to the selected program. The data card further includes a microprocessor disposed within the housing that is programmable via the keypad. A display panel is operably connected to the microprocessor for displaying a unique barcode associated with the selected program so that a vendor may scan the card and access data corresponding to the selected program. A fingerprint pad is attached to the microprocessor for verifying a cardholder identity after a barcode is scanned from the panel. A memory is connected to the microprocessor for storing user data therein so that the card will switched to an inoperable mode after a predetermined number of unauthorized attempts to access the card have been executed.

9 Claims, 6 Drawing Sheets

MULTI-FUNCTIONAL DATA CARD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

TECHNICAL FIELD

This invention relates to a data card and, more particularly, to a multifunctional credit/debit/identity data card including a fingerprint recognition mechanism.

PRIOR ART

Plastic cards carrying magnetic stripes are widely used as credit cards, debit cards, automatic teller machine (ATM) cards, telephone payment cards, etc. It is believed that billions of these cards are used throughout the world. Typically, these cards hold approximately 200 alphanumeric characters, which is the same as 200 bytes of data in computer language. The magnetic stripe is erasable and is read and written by a wide variety of commercial devices.

A primary objective of any credit system which utilizes individual identification cards must be to guarantee that the user of a card is actually authorized to make credit purchases with the card. A variety of methods are used to enhance the security of such cards and to discourage fraudulent use. Holograms are affixed to the cards to make card counterfeiting more difficult. Color face photographs of the registered card owner are affixed to the card for confirmation that the possessor of the card is the rightful owner. Personal identification numbers (PIN) are memorized by the card owner and entered into terminals such as bank ATM terminals to prove card ownership prior to cash payments to the card possessor.

In spite of all the anti-fraud methods currently used for obtaining credit, receiving cash, receiving miscellaneous benefits, etc., fraudulent use of magnetic stripe cards results in losses estimated at from many hundreds of millions of dollars to billions of dollars annually. The fraudulent methods involve a variety of techniques. Magnetic stripe cards are stolen. Lost cards are found and used. Cards are counterfeited. A person may apply for and have cards issued in the names of unsuspecting credit-worthy individuals. PIN numbers may be obtained by observing an ATM user entering his number or finding a PIN number noted in a lost or stolen wallet. Yet, the usage of credit cards and systems continues to flourish.

Accordingly, a need remains for a multifunctional data card that employs finger print identification, to overcome the above mentioned shortcomings

BRIEF SUMMARY OF THE INVENTION

In view of the foregoing background, it is therefore an object of the present invention to provide a multifunctional data card that employs fingerprint identification technology. These and other objects, features, and advantages of the invention are provided by a multifunctional data card for carrying personal information about a user.

The card includes a housing that has a generally rectangular shape and includes a keypad for initializing a selected program and for entering a user access code unique to the selected program. The housing may include a first section and a second section pivotally connected thereto. The first and second sections are selectively movable between engaged and disengaged positions for allowing a user to access data stored within the card. The card preferably further includes a plurality of lights disposed within the housing that is conveniently illuminable when the keypad is activated during operating conditions.

The card further includes a microprocessor disposed within the housing that is programmable via the keypad for conveniently processing data associated with a plurality of banking accounts that are owned by a user. The card may further include a wireless modem connected to the microprocessor for conveniently allowing a user to remotely communicate with a third party and verify data displayed on the display panel. The modem preferably includes a transceiver for receiving an input signal from a user and transmitting a corresponding output signal to a vendor accessing a select one of a plurality of banking accounts. The present invention may further include a sound-generating device connected to the microprocessor for advantageously alerting a user of unauthorized attempts to access the card.

The present invention further includes a display panel operably connected to the microprocessor for advantageously displaying a unique barcode associated with the selected program so that a vendor may scan the card and access data corresponding to the selected program.

The card further includes a fingerprint pad attached to the microprocessor for verifying a cardholder identity after a barcode is scanned from the panel. A memory is also connected to the microprocessor for advantageously storing user data therein so that the card will switch to an inoperable mode after a predetermined number of unauthorized attempts to access the card have been executed. A power supply source disposed within the housing is electrically coupled to the microprocessor for powering the card.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
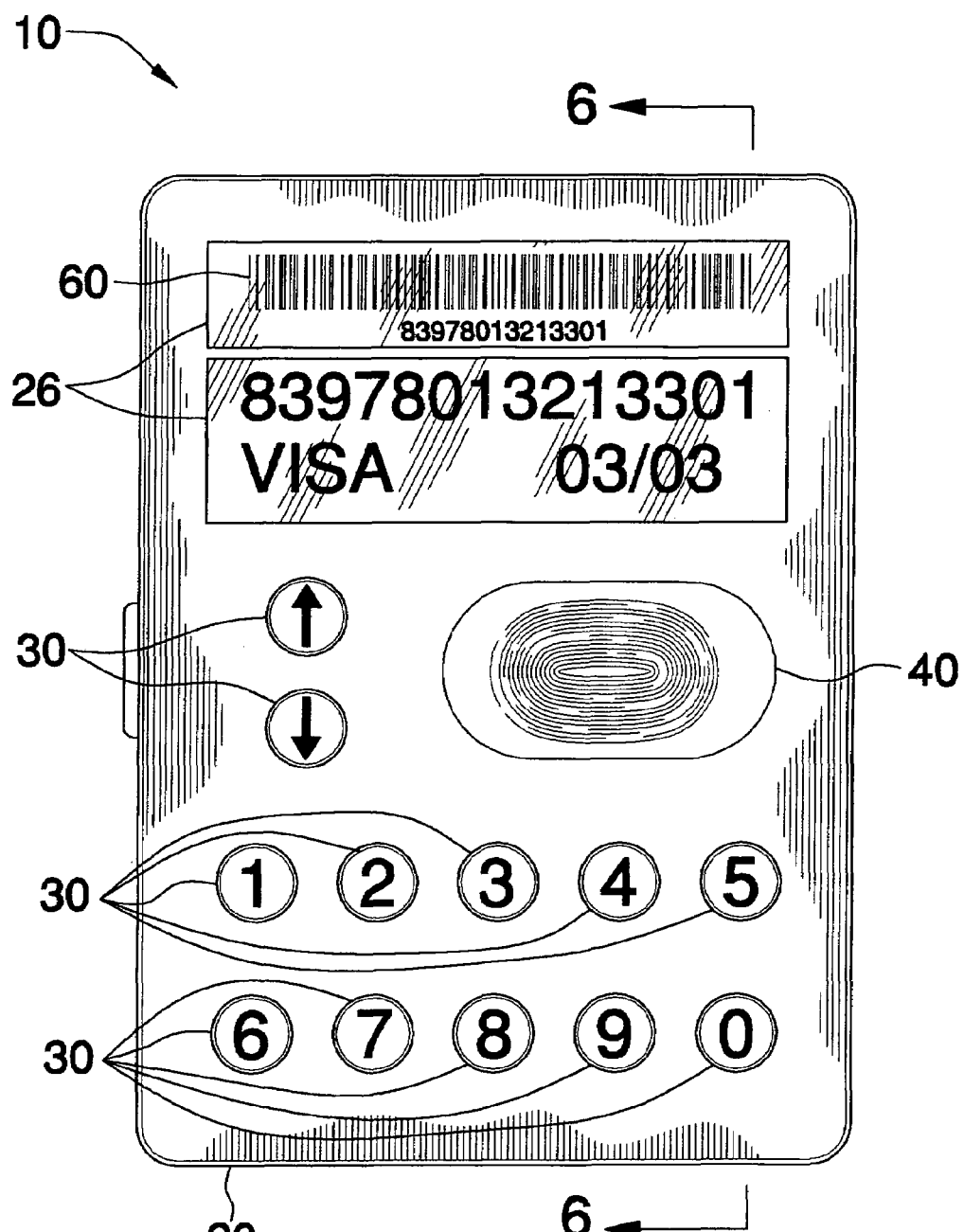
FIG. 1 is a top plan view showing a multifunctional data card, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures. Prime and double prime notations refer to alternate embodiments of similar elements.

The device of this invention is referred to generally in FIGS. 1–7 by the reference numeral 10 and is intended to provide a multifunctional data card. It should be understood that the device 10 may be used to access many different types of personal accounts and should not be limited to only credit card accounts.

Figure 2:
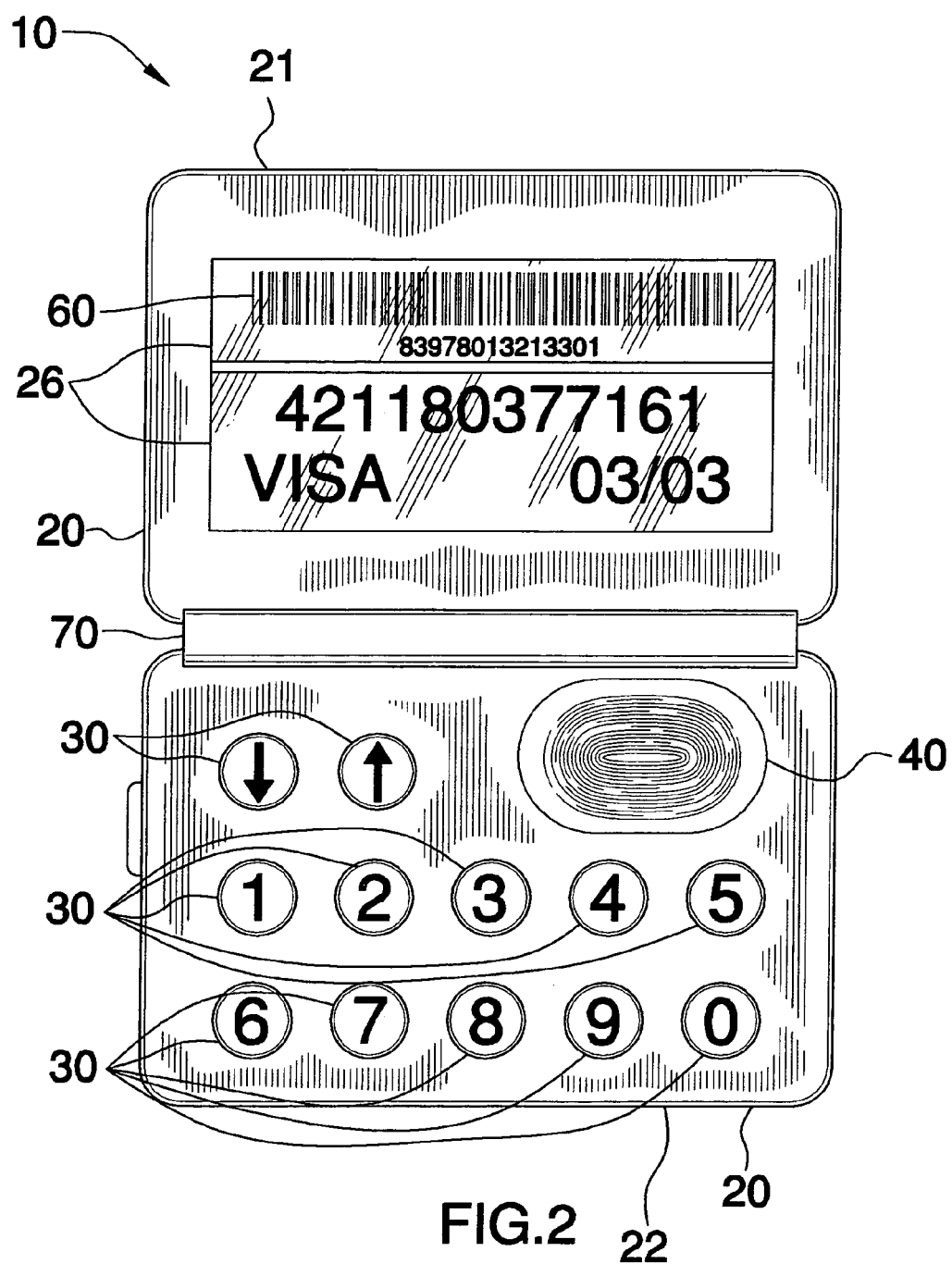
FIG. 2 is a top plan view showing an alternate embodiment of the present invention shown in FIG. 1.
Figure 3:
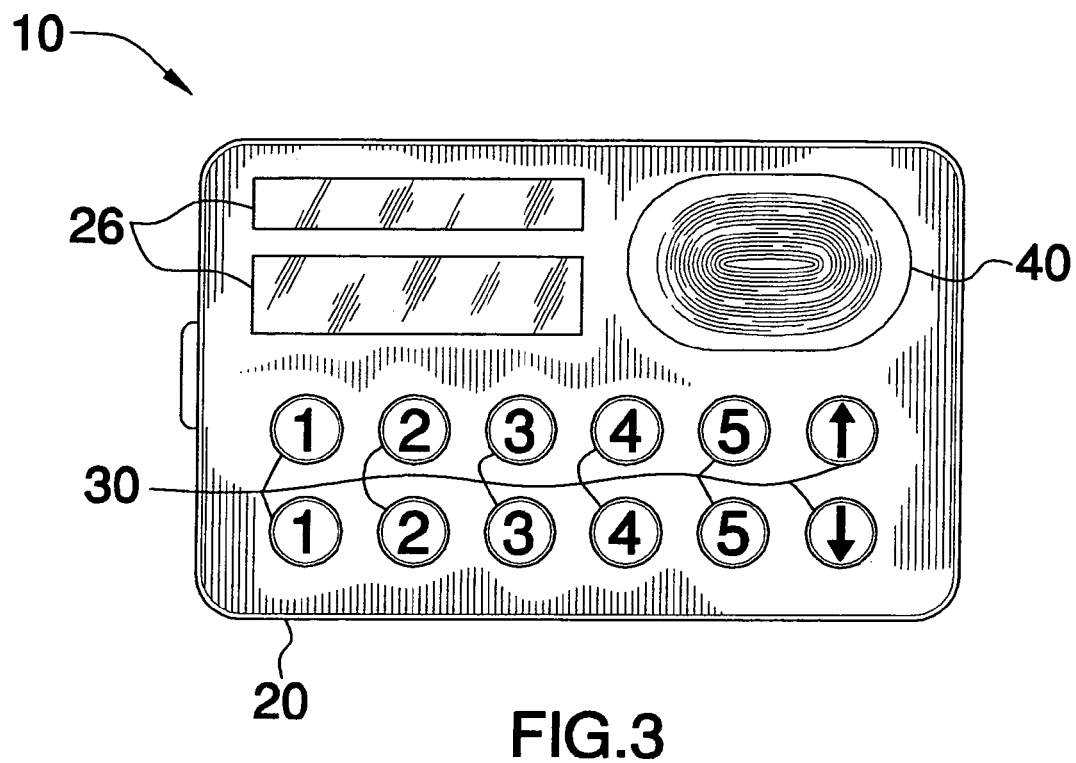
FIG. 3 is a top plan view showing another embodiment of the present invention shown in FIG. 1.
Figure 4:
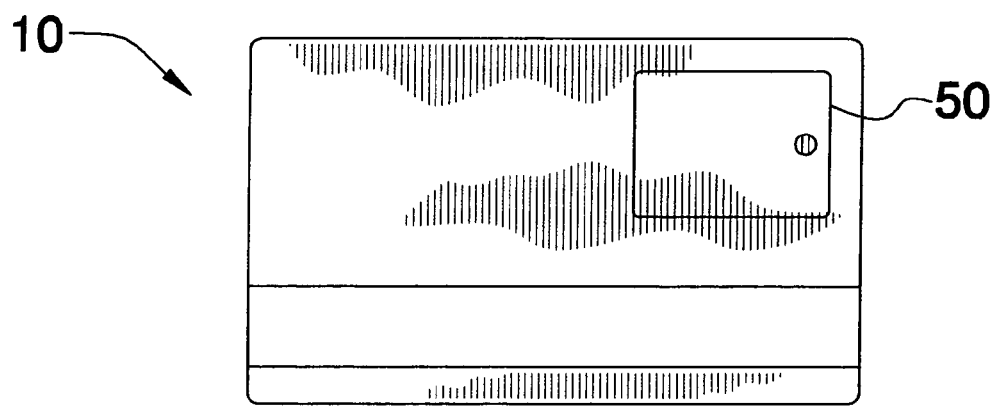
FIG. 4 is a bottom plan view of the device shown in FIG. 3.
Figure 5:
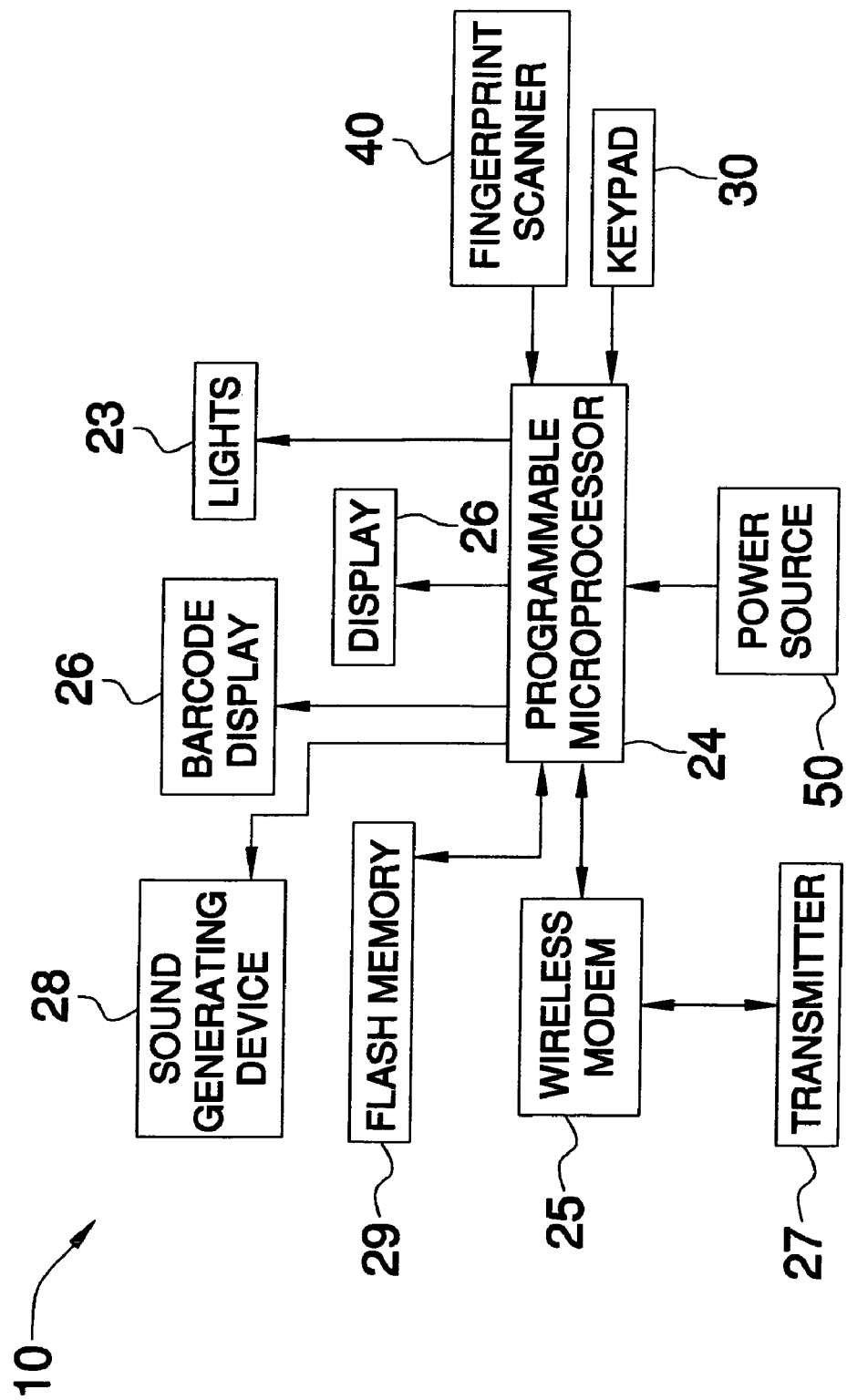
FIG. 5 is a schematic block-diagram of the present invention.
Figure 6:
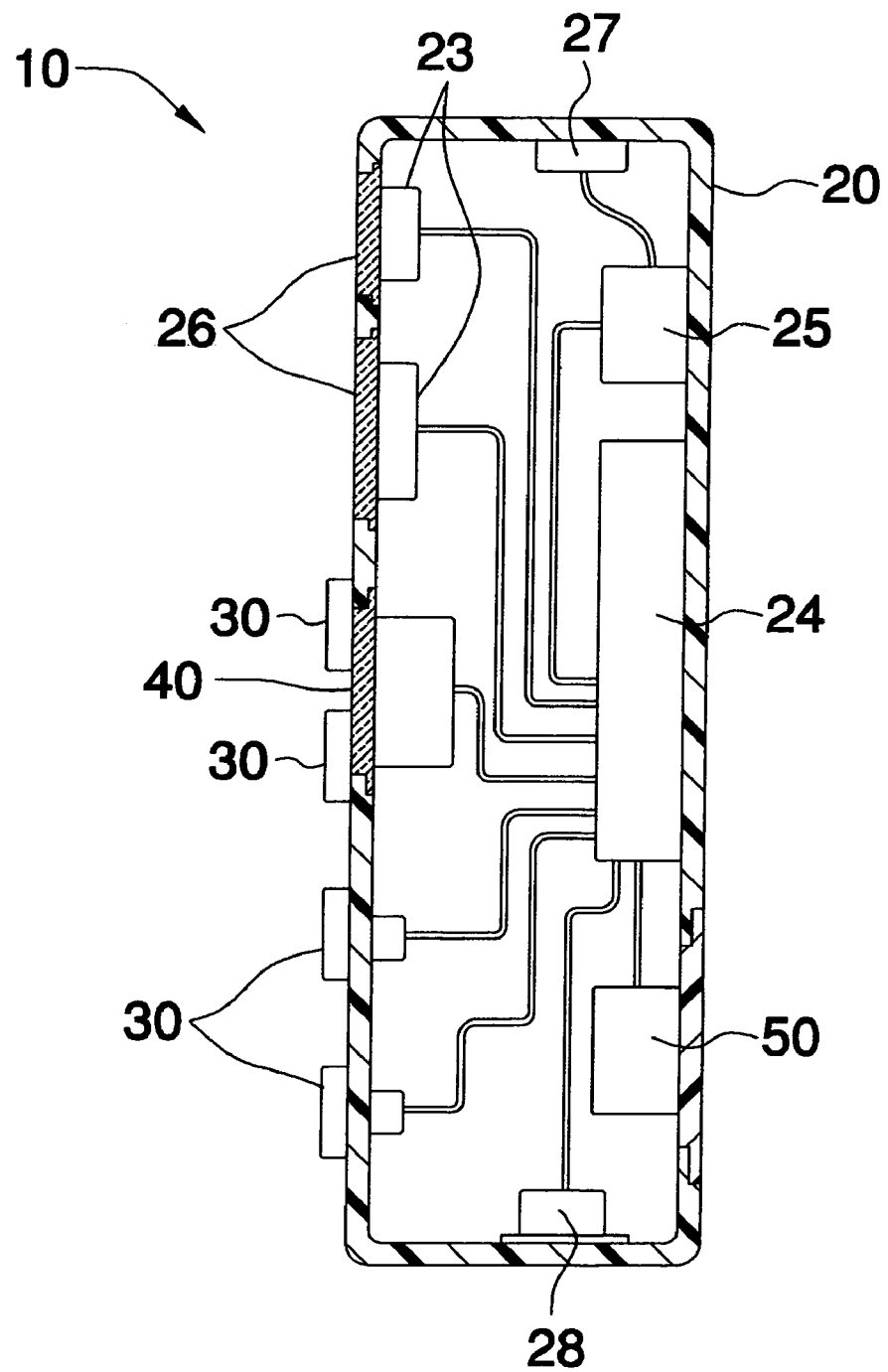
FIG. 6 is a cross-sectional view of the device shown in FIG. 1, taken along line 6—6.
Figure 7:
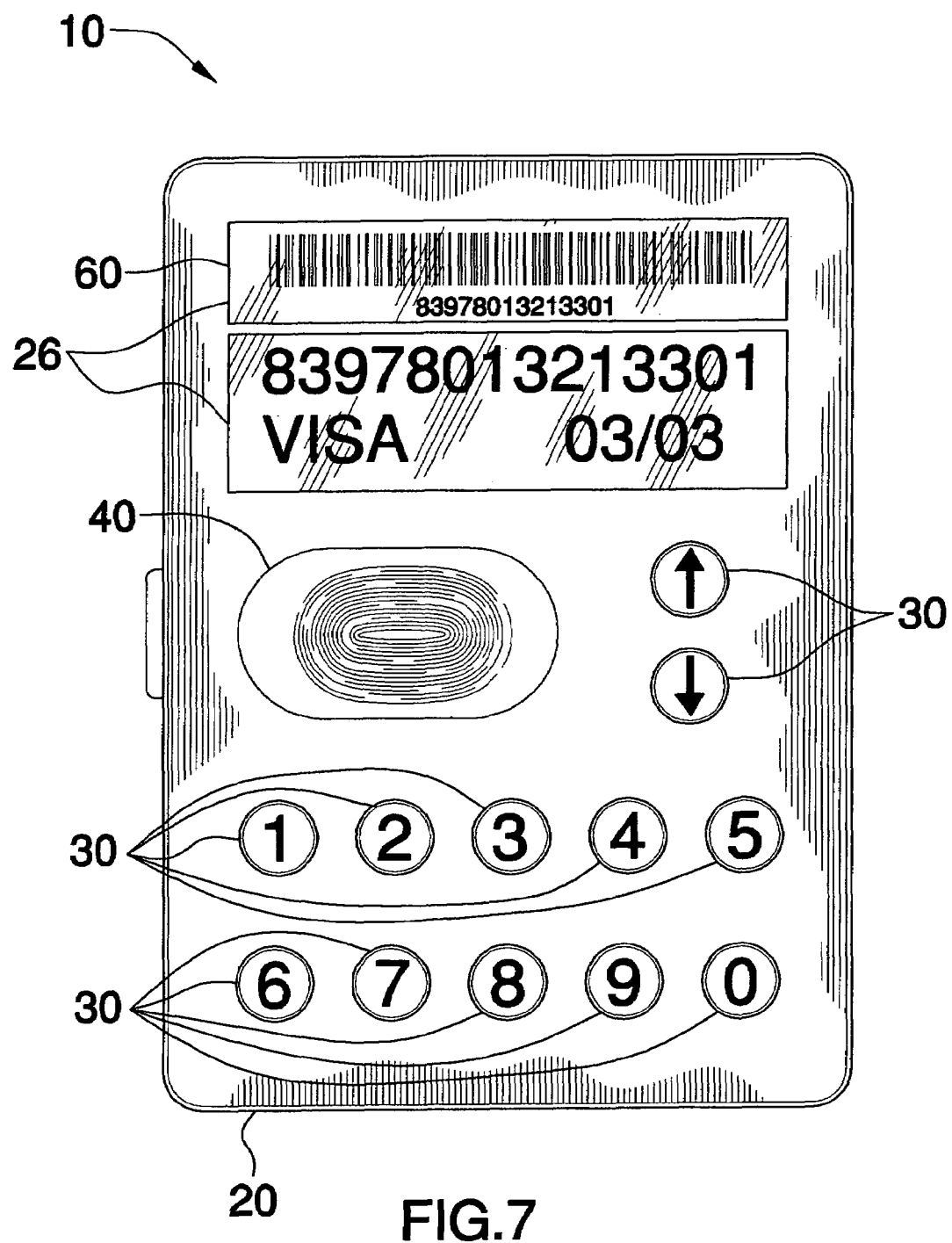
FIG. 7 is top plan view of the device shown in FIG. 1, for left-handed users.

Referring initially to FIG. 1, the device 10 includes a housing 20 that has a generally rectangular shape and includes a keypad 30 for initializing a selected program and for entering a user access code unique to the selected program. The housing 20 may of course have alternate embodiments as shown in FIGS. 2–3, and have the keypad 30 in a left hand-friendly orientation as shown in FIG. 7. Now referring to FIG. 2, the housing 20 includes a first section 21 and a second section 22 pivotally 70 connected thereto. The first 21 and second 22 sections are selectively movable between engaged and disengaged positions for allowing a user to access data stored within the card 10. The card 10 further includes a plurality of lights 23 disposed within the housing 20 that is conveniently illuminable when the keypad 30 is activated during operating conditions. The housing 20 can also be converted to a key chain for convenience of use.

The card 10 further includes a microprocessor 24 disposed within the housing 20 that is programmable via the keypad 30 for conveniently processing data associated with a plurality of banking accounts that are owned by a user. The microprocessor 24 grants this device 10 with virtually limitless applications. The microprocessor 24 can be programmed to function as an emergency service card capable of notifying the police, fire department, and medical services. Other applications may have the device 10 be used as a mechanism for keeping track of government food stamps and their limits, or have the device function as a passport or visa.

The card 10 further includes a wireless modem 25 connected to the microprocessor 24 for conveniently allowing a user to remotely communicate with a third party and verify data displayed on the display panel 26. The modem 25 includes a transceiver 27 for receiving an input signal from a user and transmitting a corresponding output signal to a vendor accessing a select one of a plurality of banking accounts. The present invention further includes a sound-generating device 28 connected to the microprocessor 24 for advantageously alerting a user of unauthorized attempts to access the card 10.

The microprocessor 24 may also be programmed to activate the sound-generating device 28 to alert or remind the owner of important times during the day. For example, the elderly might employ it to remind them of their schedule to take their prescription drugs, or women may use it to remind them of taking their birth control pill.

The present invention further includes a display panel 26 operably connected to the microprocessor 24 for advantageously displaying a unique barcode 60 associated with the selected program so that a vendor may scan the card and access data corresponding to the selected program. This display panel 26 will display the card's account number, type of card, the cardholder's name, and the date of expiration. The display panel 26 and keypad 30 may also be customized with larger dimensions for individuals who have poor eyesight.

The card 10 further includes a fingerprint pad 40 attached to the microprocessor 24 for verifying a cardholder identity after a barcode 60 is scanned from the panel 26. In addition to this new safety measure, the conventional means of protecting such a card 10, like the owner's signature and/or picture may also be applied to the card 10. A memory chip 29 is also connected to the microprocessor 24 for advantageously storing user data therein so that the card 10 will switch to an inoperable mode after a predetermined number of unauthorized attempts to access the card 10 have been executed. A power supply source 50 disposed within the housing 20 is electrically coupled to the microprocessor 24 for powering the card 10.

The appealing feature of the device 10 is its improved identification method that will only permit a verified user to complete a transaction by using both a personal identification number and a proper thumbprint match. This device 10 will greatly reduce the incidence of bank and credit card fraud in stores and banks.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A multifunctional data card for carrying personal information about a user, said card comprising:

a housing having a generally rectangular shape and including a keypad for initializing a selected program and for entering a user access code unique to the selected program;

a microprocessor disposed within said housing and being programmable via said keypad for processing data associated with a plurality of banking accounts that are owned by a user;

a display panel operably connected to said microprocessor and for displaying a unique barcode associated with the selected program so that a vendor may scan the card and access data corresponding to the selected program;

a fingerprint pad attached to said microprocessor for verifying a cardholder identity after a barcode is scanned from said panel;

a memory connected to said microprocessor and for storing user data therein so that said card will switched to an inoperable mode after a predetermined number of unauthorized attempts to access said card have been executed;
  a power supply source disposed within said housing and electrically coupled to said microprocessor; and
  a first section and a second section pivotally connected thereto, said first and second sections being selectively movable between engaged and disengaged positions for allowing a user to access data stored within said card.

2. The card of claim 1, further comprising:
  a wireless modem connected to said microprocessor and for allowing a user to remotely communicate with a third party and verify data displayed on said display panel, said modem including a transceiver for receiving an input signal from a user and transmitting a corresponding output signal to a vendor accessing a select one of a plurality of banking accounts.

3. The card of claim 1, further comprising:
  a sound generating device connected to said microprocessor and for alerting a user of unauthorized attempts to access said card.

4. The card of claim 1, further comprising:
  a plurality of lights disposed within said housing and being illuminable when said keypad is activated during operating conditions.

5. A multifunctional data card for carrying personal information about a user, said card comprising:
  a housing having a generally rectangular shape and including a keypad for initializing a selected program and for entering a user access code unique to the selected program;
  a microprocessor disposed within said housing and being programmable via said keypad for processing data associated with a plurality of banking accounts that are owned by a user;
  a display panel operably connected to said microprocessor and for displaying a unique barcode associated with the selected program so that a vendor may scan the card and access data corresponding to the selected program;
  a fingerprint pad attached to said microprocessor for verifying a cardholder identity after a barcode is scanned from said panel;
  a memory connected to said microprocessor and for storing user data therein so that said card will switched to an inoperable mode after a predetermined number of unauthorized attempts to access said card have been executed;
  a power supply source disposed within said housing and electrically coupled to said microprocessor;
  means for wirelessly communicating directly with a third party to verify data displayed on said display panel, said wireless communicating means including a transceiver for receiving an input signal from a user and transmitting a corresponding output signal to a vendor accessing a select one of a plurality of banking accounts; and
  a first section and a second section pivotally connected thereto, said first and second sections being selectively movable between engaged and disengaged positions for allowing a user to access data stored within said card.

6. The card of claim 5, further comprising;
  a sound generating device connected to said microprocessor and for alerting a user of unauthorized attempts to access said card.

7. The card of claim 5, further comprising:
  a plurality of lights disposed within said housing and being illuminable when said keypad is activated during operating conditions.

8. A multifunctional data card for carrying personal information about a user, said card comprising:
  a housing having a generally rectangular shape and including a keypad for initializing a selected program and for entering a user access code unique to the selected program;
  a microprocessor disposed within said housing and being programmable via said keypad for processing data associated with a plurality of banking accounts that are owned by a user;
  a display panel operably connected to said microprocessor and for displaying a unique barcode associated with the selected program so that a vendor may scan the card and access data corresponding to the selected program;
  a fingerprint pad attached to said microprocessor for verifying a cardholder identity after a barcode is scanned from said panel;
  a memory connected to said microprocessor and for storing user data therein so that said card will switched to an inoperable mode after a predetermined number of unauthorized attempts to access said card have been executed;
  a power supply source disposed within said housing and electrically coupled to said microprocessor;
  means for wirelessly communicating directly with a third party to verify data displayed on said display panel, said wireless communicating means including a transceiver for receiving an input signal from a user and transmitting a corresponding output signal to a vendor accessing a select one of a plurality of banking accounts;
  a sound generating device connected to said microprocessor and for alerting a user of unauthorized attempts to access said card;
  a first section and a second section pivotally connected thereto, said first and second sections being selectively movable between engaged and disengaged positions for allowing a user to access data stored within said card;
  means for entering a user access code unique to a selected program such that the user may initialize the selected program; and
  means for storing user data within said memory such that said card will be switched to an inoperable mode after a predetermined number of unauthorized attempts to access said card have been executed.

9. The card of claim 8, further comprising:
  a plurality of lights disposed within said housing and being illuminable when said keypad is activated during operating conditions.

* * * * *